July 29, 1941.   F. GRIEDER   2,250,931
APPARATUS FOR CUTTING METAL TUBES
Filed March 1, 1940   2 Sheets-Sheet 1

Inventor:
Fred Grieder
By Orel J. Burdick
Attorney

July 29, 1941.  F. GRIEDER  2,250,931
APPARATUS FOR CUTTING METAL TUBES
Filed March 1, 1940  2 Sheets-Sheet 2
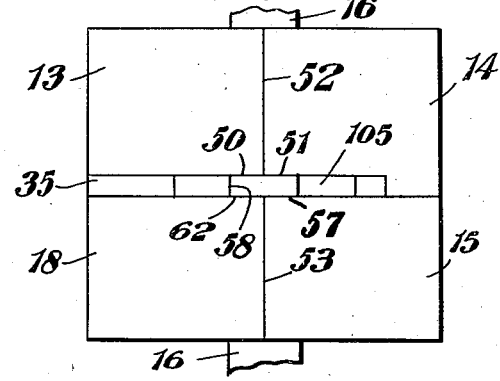
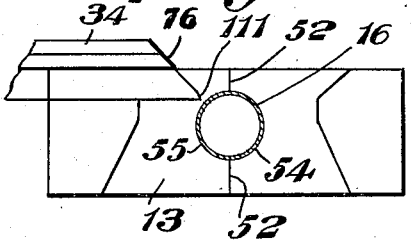
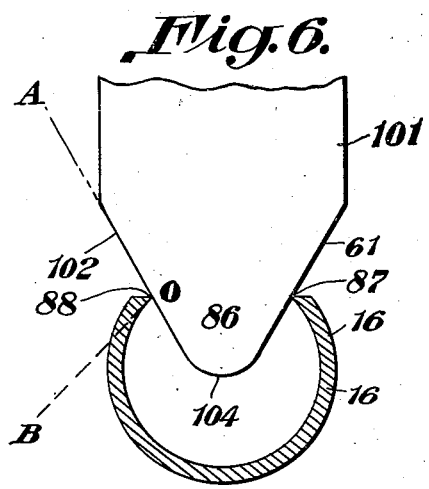
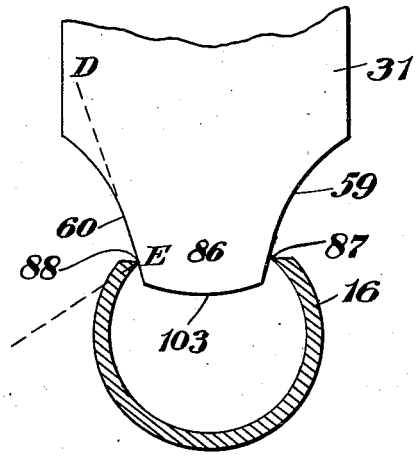
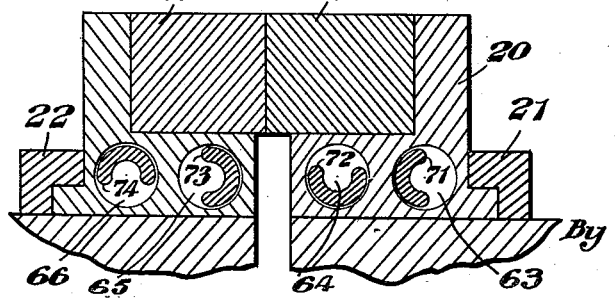
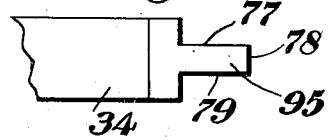

Patented July 29, 1941

2,250,931

UNITED STATES PATENT OFFICE 2,250,931

APPARATUS FOR CUTTING METAL TUBES

Fred Grieder, Detroit, Mich.

Application March 1, 1940, Serial No. 321,613

14 Claims. (Cl. 164—49)

This invention relates to a tube cutting punch and die mechanism whereby a metallic or similar tube may be cut by means of punches and dies located entirely on the outside of the tube.

The operation of cutting metal tubing into pieces of suitable lengths presents a serious problem in many industries wherein apparatus containing such tubing is being manufactured. Several methods for cutting such tubing have been devised, all of them unsatisfactory when thin tubing of large diameter is being cut. Such tubing is often cut in a lathe, while an ordinary lathe tool is used to cut it into two pieces. This process produces an inside burr, unless expensive and inconvenient means are resorted to to prevent it and is also objectionable because of the tendency of the tube to whip when the long lengths are being cut off. To aviod the latter objection, tubing is often cut in a shear which causes a complete collapse of the tube at the point of cutting. It is then turned in a lathe and a small portion of the tube is removed from the cut end leaving a fairly smooth end. Saws are also used to some extent for cutting such tubing, but a saw produces burrs both on the inside and outside of the tube and leaves a rough end.

In order to overcome the difficulties, I have devised a combination punch and die mechanism suitable for use in an ordinary punch press which cuts a piece of tubing at any point along its length, regardless of the distance of the desired cut from either end of the tube, by the use of a plurality of dies and punches. In the preferred modification of my invention, the tube is held tightly by a plurality of dies all around its circumference adjacent to the point at which the cut is to be made, and while so held a punch is forced through the tube at a very acute angle. This causes a hole to be cut in one side of the tube, and I have found that such an arrangement leaves substantially no burr or roughness along the edges which will eventually be part of the finished end of the tube. When this operation is completed another punch can be forced into the hole so formed and used to exert a shearing force against the edges of the die holding from the outside. This second cut will not leave any burr or rough edge either, and this method has the distinct advantage that it is unnecessary to have any plug die or any other metal object on the inside of the tube when the opening cut is made.

It is, therefore, an important object of my present invention to provide a punch and die mechanism which will cut a piece of tubing in such a manner as to leave a smooth, burr free end.

It is a further object of this invention to provide a punch and die mechanism for cutting tubing which will cut the tubing with a minimum of waste.

It is a further object of my invention to provide a tube cutting mechanism adapted for use in a punch press.

It is a further object of my invention to provide a tube cutting mechanism adapted to cut metallic and similar tubes by means of a system of punches and dies which operate without reference to the ends of the tube.

It is a further object of this invention to provide a process for cutting tubing in which the above disclosed objectives are accomplished.

Other and further objects of this invention will be evident from the following specification and claims, and from the accompanying drawings.

As shown on the drawings:

Figure 4 is a plan view showing the top surface of the dies from the apparatus shown in Figure 1.

Figure 5 shows an elevational view of the inside surfaces of two of the dies shown in Figure 4 and a portion of one of the punches, the tube being cut being illustrated in cross section.

Figure 6 shows the second punch with a part broken away just as it is in the act of entering the tube, through the opening produced by the first punch.

Figure 7 is similar to Figure 6 except that a different modification of punch is shown.

Figure 8 is a cross section of another portion of my device, taken along the line VIII—VIII of Figure 1.

Figure 9 is a top plan view of one of the punches of my device with parts broken away.

As shown on the drawings:

Figure 1:
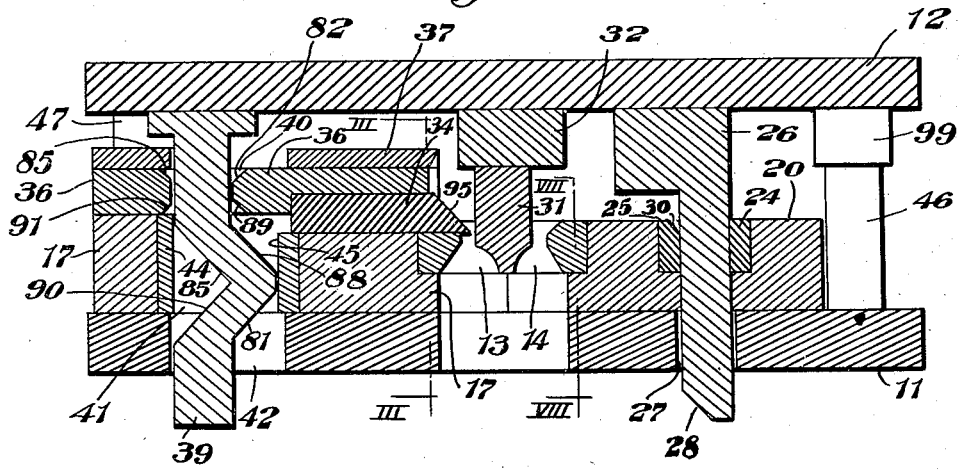
Figure 1 is a cross section of my invention taken through the middle of the punches, with parts shown in elevation.
Figure 2:
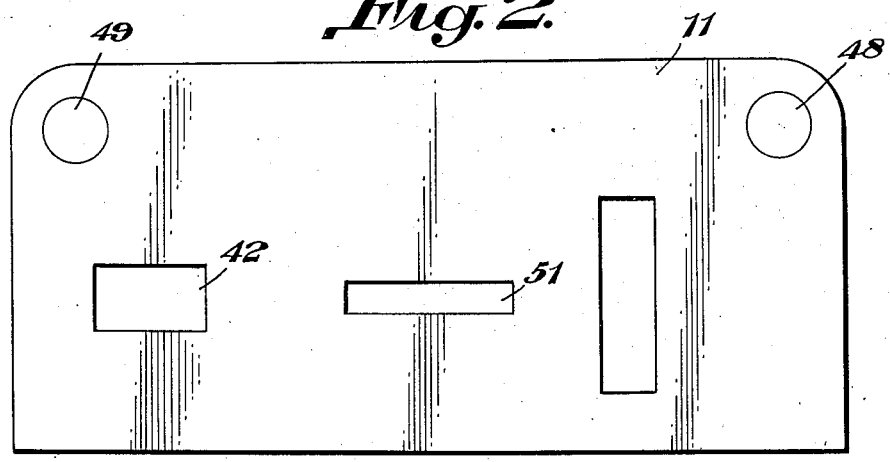
Figure 2 is a plan view of the bottom plate of my combination tube cutting die, showing the location of certain openings.
Figure 3:
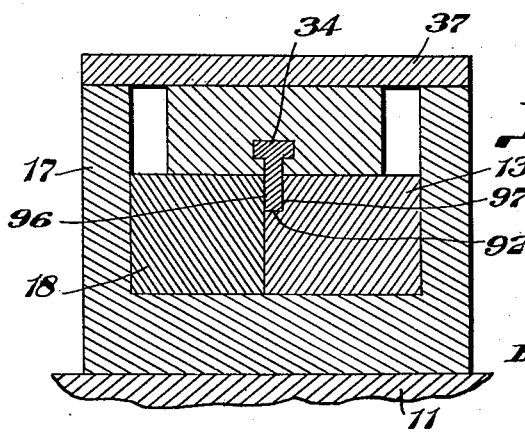
Figure 3 is a cross section of a portion of my invention showing certain parts broken away, and taken along the line III—III of Figure 1.

A lengthwise, vertical cross section of a complete apparatus embodying the principles of my invention is illustrated in Figure 1. It consists of a bottom plate 11 and a top plate 12, between which, the various parts comprising my invention are mounted. The tube being cut is rigidly held between dies or jaws 13 and 14 in a manner more particularly shown in Figure 5 on the drawings wherein the tube being cut is shown in cross section at 16. The die 13 is supported by a block 17 which is rigidly attached to the bottom plate 11. Located in front of the die 13 is another die 18 as shown in Figure 4 of the drawings. This is also rigidly supported by the block 17. The die 14 is rigidly attached to the block 20, said block 20 being slidably attached to the bottom plate 11 as shown in Figure 8 of the drawings. Directly in front of die 14 is another similar die 15. The block 20 is held on the bottom plate 11 by means of angle blocks shown at 21 and 22 these blocks being so placed that the block 20 may freely move toward and away from the tube being cut, and in a line at right angles to the said tube. Mounted in the block 20 are two bearing blocks 24 and 25 which provide bearing surfaces for the metal block 26 which is rigidly supported on the top plate 12 and which passes through the block 20 and through a hole 27 in the bottom plate 11, thereby contacting the blocks 24 and 25.

The lower end of block 26 is provided with an angular bearing surface or cam 28 which is designed to cooperate with a similar angular surface or cam 30 on the block 25.

A punch or cutter 31 is rigidly attached to block 32 which, in turn, is supported by the top plate 12. A second punch or cutter 34 is slidably mounted in a groove 35 and is rigidly attached to a sliding metallic block 36 which is adapted to slide in a space between the block 17 and a cover 37 attached across the top of the block 17. The cutting end of the punch 34 is provided with a bevelled end as shown at 95, at one end of which is a cutting edge as shown at 78. The punch 34 is provided with two parallel sides as shown at 96 and 97 and two additional cutting edges occur at 77 and 79 where the said parallel sides 96 and 97 intersect the bevelled end 95. The cutting edge 78 occurs where the said bevelled end 95 intersects bottom surface 92 of punch 34.

Attached to the top plate 12 is a double cam member 39 which extends through a hole at 40 in the sliding block 36, through a hole at 41 in the block 17, and a hole 42 in the bottom plate 11. Within the hole 41, and attached to the block 17 are two metallic bearing blocks 44 and 45 which act as guides for the double cam member 39. The top plate 12 and the bottom plate 11 are held in proper register by a plurality of posts, preferably two, one of which is shown at 46. The post 46 is rigidly held in a hole 48 in bottom plate 11, and slides within a sleeve 99 which is rigidly set in the top plate 12. A similar post is attached in a hole 49 in the bottom plate 11, and slides in a sleeve 47 which is set in the top plate 12.

The four dies, 13, 14, 15 and 18 are shown more in detail in Figures 4 and 5. Figure 4 is a top plan view showing all four of these dies assembled together as they occur in the preferred modification of my apparatus shown in Figure 1 of the drawings when the punching operations are made, and with a piece of metal tubing in position to be cut as shown at 16.

The inner faces of each of the dies 13, 14, 15, and 18, being the edges shown in the drawing as contacting along the lines 52 and 53 contain a semicircular groove as shown at 54 and 55. These semicircular grooves are of such size that they form a tight fit around the tube being cut, as shown in Figure 5 in which the tube to be cut is shown at 16. The tubing to be cut is also shown in Figure 4 at 16, in position to be cut and tightly held at one side of the point of cutting, shown at 58, by the dies 13 and 14 and at the other side of said point of cutting by dies 15 and 18.

One shape of punch 31, suitable for use in my invention is shown at 101 in Figure 6 wherein the tube 16 has already had one side cut away by the punch 34, leaving a hole in which has been inserted the end of the punch 101. The angle AOB must be greater than 90 degrees. The exact size of the angle AOB for best results will vary somewhat with the size, thickness of material, and nature of the material of which the tube 16 is made. However, I have found that a value of 100 degrees will be entirely satisfactory and in most cases preferable. However, angles as small as 95 degrees and as great as 115 degrees will still be operative. The angle AOB may increase to much more than 115 degrees as the punch is forced further and further into the tube. However it should be at least 95 degrees when punch 101 first contacts the tube 16 in order to insure a sufficient outward thrust against the edge.

The purpose of keeping angle AOB greater than 90 degrees is to force the cut away portion, otherwise called the slug, of the tube 16 outwardly rather than forcing it into the inside of the tube. As long as this cut away portion is being forced outwardly the edge 102 of the punch will cooperate with the edge of the dies 13, 14, 15, and 18 as shown at 58, and will act as a shear to make a clean cut of the tube 16, free from any burrs or jagged edges.

In Figure 7 is shown another and preferred modification of the end of my punch 31. Here the punch 31 has curved cutting edges at 59 and 60. Such curved edges will keep the angle DEF much smaller during the cutting of the top half of the tube than is possible with the straight edges shown at 61 and 102. The end 103 and 104 of either modification of my punch should have cutting edges suitable for cooperating with the edges 50, 51, 57, and 62 of dies 13, 14, 15 and 18 to cut out the lower half of the tube 16.

The exact shape of the end of the punches shown at 31 and 101 is not extremely material as long as the force exerted to drive the punch 31 or 101 into the inside of the tube has an outward, positive component tending to force the edge of the tube contacting the punch 31 or 101 outwardly and against the edges 50, 51, 57, and 62 of the dies 13, 14, 15, and 18.

At Figure 8 is shown a cross section of the metal block 20 and the dies 14 and 15, the angle blocks 21 and 22 and a portion of the bottom plate 11. The block 20 has holes drilled at 63, 64, 65, and 66 containing compression coil springs shown in cross section at 71, 72, 73, and 74. Each of said coil springs bear against block 17 and exert a force tending to drive blocks 17 and 20 apart.

A detail of the cutting end of punch 34 is shown in Figure 9, the punch 34 is beveled as shown at 76 producing three straight, cutting edges as shown at 77, 78, and 79. In the preferred modification of my invention, the cutting edges 77 and 79 have angles of substantially 90° each, while the cutting edge 78 has an angle of about 45°, though this latter angle may vary within wide limits depending on the material being cut and the angle at which the knife 34 contacts the tube 16. Especially when cutting thickwalled tubing, it is desirable to have the cutting edge 78, have an angle substantially greater than 45° more nearly approaching 90°. This may best be done by rounding the edge 78 as is shown at 111 to produce this desired angle.

To cut a piece of metallic tubing with my apparatus, the apparatus is placed in a suitable punch press, the plates 11 and 12 being attached to the press. The top plate 12 is elevated to a point at which the cam surface 81 of the double cam 39 is above the cam surface 82 on the sliding metal blocks 36, and a cam surface 28 is above a cam surface 30 on the bearing block 25. In this position the springs 71, 72, 73, and 74 will force the block 20 away from block 17 a short distance causing a separation of the dies 13 and 14 along the line 52 and a separation of the dies 15 and 18 along the line 53. Also, the punch 31 will be in a position above the dies 13, 14, 15 and 18 so that the piece of tubing to be cut may be readily shoved through the hole formed by the grooves 54 and 55 which extend along the edges of blocks 13, 14, 15 and 18 as stated above. The tube is so placed that the point at which it is desired that it should be cut is in the opening 105 between the dies 13, 14, 15, and 18. Then, pressure is exerted on the top plate 12 forcing it toward the bottom plate 11. The first action which takes place is that the cam surface 28 contacts the cam surface 30, thereby forcing the bearing block 25 and the block 20 and the dies 14 and 15 in a direction toward the dies 13 and 18 and into a position where the dies 14 and 15 contact the dies 13 and 18, at which point the tube 16 is firmly held between the dies 13, 14, 15 and 18. As the downward movement of the top plate 12 continues, the bearing surface 81 of the double cam 39 contacts the cam surface 82 of the block 36, thereby forcing said block 36 toward the tube 16, and at the same time forcing the punch 34 against the outer surface of the tube 16 as shown in Figure 5. As this movement of punch 34 continues the said punch is forced into, and finally through the tube 16, cutting off a portion of said tube as shown in Figures 6 and 7. Then, as the downward movement of the top plate 12 continues further, a cam surface 84 contacts a cam surface 85, thereby forcing the block 36 and the punch 34 to the left and away from the tube 16. As soon as the punch 34 is clear of the path of the punch 31, the said punch 31 enters the opening 86 in the tube 16 as shown in the Figures 6 and 7. As the punch 31 and top plate 12 descends still further, the edges 87 and 88 of the tube 16 are forced outwardly and are cut away from the remainder of the tube by a shearing action and finally, the lower portion of the tube is punched out, thereby severing the tube.

After the tube 16 has been severed, the top plate 12 is raised by the punch press during which changes occur as follows: A cam surface 88 on the double cam 39 contacts a cam surface 89 on the metal block 36 forcing the block toward the tube 16 a second time. Thereafter a cam surface 90 on the double cam 39 contacts a cam surface 91 on the block 36 and forces the said block 36 back to its original position. After that, as the top plate 12 is raised still further the block 20 is released by the cam surface 28 rising to a point where it again contacts the cam surface 30 on bearing surface 25, thereby allowing the springs 71, 72, 73, and 74 to force the block 20 to the right, thereby opening the dies or jaws 13, 14, 15, and 18. At this point the entire mechanism is in its original position. Thereafter the tubing may be removed or one of the pieces of tubing may be placed in another position within the dies for making a further cut, as may be desired.

The depth of the opening 86 is not extremely critical. The deepest part of the opening 86 is a secant line across the section along which the tube 16 is to be cut. It must be deep enough to extend into the inside of the tube 16 so an opening will be provided for the punch 31 to enter. It may be much deeper. However, if it is too deep, so that the punch 34 strikes the tube 16, from a direction too near in line with a diameter of the tube 16, the tube will collapse. How near in line with a diameter the punch 34 can approach the tube 16 depends upon the physical characteristics and wall thickness of the tube 16. It is always possible to adjust the punch 34 to make an opening large enough to admit the second punch 31 in the manner explained above without causing the tube 16 to collapse.

While the above process and apparatus have been described and illustrated as cutting round tubing, it will be understood that the apparatus may be modified so as to cut elliptical, square, triangular, pentagonal, hexagonal and similar shapes of tubing, without departing from the broad principles of this invention. It will also be evident that the tube does not have to be cut square across, but that the cut may be made at a variety of angles, and also that the cut does not need to be made in a plane, but that the punches and dies may be so shaped that the cut may be a portion of a cylinder, or similar cylindroidal surface.

Thus it will be seen that I have devised a new and improved method and apparatus for cutting metal and similar tubing wherein the cut can be made at any distance from the ends of the tube, and without inserting a plug die or any other device into the interior of the tube through the ends thereof, and without leaving any roughened or uneven surface at the cut ends thereof.

It will be evident that this apparatus and process is not limited to the cutting of metallic tubing, but may be used for cutting of tubing made of other materials.

I am aware that numerous details of construction may be varied through a wide range without departing from the principles of this invention and I, therefore, do not purpose limiting the patents granted hereon otherwise necessitated by the prior art.

I claim as my invention:

1. A tube cutting mechanism comprising separable jaws for enclosing a tube around the periphery of the same, and tightly holding the tube, cutting means exterior to said tube and adjacent said jaws for cutting a slot in the tube, means for entering said slot and exerting an outward shearing stress against the walls of the tube along the interior of the tube adjacent the line of contact of said jaws with the tube whereby the tube will be severed along the said line.

2. In a device for cutting metal tubes, separable jaw means for holding a tube securely at all points around two diameters thereof, and supporting said tube against outward distortion along the entirety of each of said diameters, punch means having substantially the same thickness as the distance along said tube separating said two diameters, a slot in said first mentioned means exposing the portion of said tube between said two diameters, means for forcing said punch means into said slot, against said tube, and completely through said tube and out the opposite side thereof, thereby cutting away a portion of said tube, a second punch means having substantially the same thickness as said first mentioned punch means, and having a constantly increasing width, and means for forcing said second punch means into the hole in said tube resulting from the operation of said first punch means and completely through said tube thereby severing the same, the contour of the edge of said second punch means being such that the exterior angle made by said edge with the edge of said tube at the point of contact therewith is in excess of ninety degrees until said punch has been forced half way through said tube.

3. A device for cutting a tube, comprising a separable die means fitting tightly around the outside of the tube to be cut, a groove in said die means, a cutter operating along said groove and along a secant line across the section of the tube to be cut, means for forcing said cutter along said groove and into and through the tube along said secant line and means for returning said cutter to its original position thereby forming a hole in the tube, a second cutter, having one wide and one narrow end, cutting edges on said die means and exterior to said tube to cooperate with said cutters, and means for forcing the narrow end of said second cutter into the hole formed by said first mentioned cutter.

4. A device for cutting a tube, comprising a separable die means fitting tightly around the outside of the tube at the point to be cut, a groove in said die means, a cutter operating along said groove and along a secant line across the section of the tube to be cut, and means for forcing said cutter along said groove and into and through the tube to be cut, along said secant line to cut a slot into the tube, a second cutter, having a width greater than the tube, means for forcing said second cutter into said opening and completely through the tube, arcuate cutting edges on said second cutter, said edges being so proportioned as to form an external angle of at least 95° and not more than 115° with the tube at the ends of said slot until the said second cutter has been forced half way through the tube.

5. A tube cutting mechanism comprising a set of separable jaws for holding a tube, surfaces on said jaws conforming to the shape of a tube to be cut, cam means for opening and closing said jaws, a slot in said jaws, a cutter operating in said slot, a second cam means for forcing said cutter along said slot and against and into the tube, and cutting a hole into the tube, a third cam means for forcing said cutter back to its original position, a second slot in said jaws, and a second cutter operating in said second slot and cam means for forcing said second mentioned cutter along said second mentioned slot and into the hole formed in the tube by said first mentioned cutter and completely through the tube, thereby severing the same.

6. A device for cutting a tube comprising a set of separable jaws adapted to fit around a tube to be cut, surfaces on said jaws conforming to the shape of a tube to be cut, means for opening and closing said jaws, grooves in said jaws to form an opening the size of the tube to be cut, when said jaws are in closed position, a slot in said jaws crossing and making a secant line with said opening, a cutter operating in said slot, means for forcing said cutter through the tube to be cut along said secant line, a second opening in said jaws which intersects said slot and said opening, a second cutter operating through said second opening, and means for forcing said second cutter through said tube, into said second opening and through the tube to be cut.

7. A tube cutting device comprising two sets of separable jaws external to said tube to support said tube against distortion and rotation at two perimeters thereof, a space between said sets of jaws, a cutter operating in said space and along a secant line across a section of the tube to be cut at the point of cutting, means for moving said cutter along the secant line, to cut an opening into said tube, a second cutter operating in said space in a direction substantially at right angles to said secant line and in line with said opening made by said first cutter and means to move said second cutter into and out of said opening.

8. In an apparatus for cutting metal tubing, a combination comprising separable jaws for supporting the tube exteriorly at the point of cutting and two punches operating substantially at right angles to each other, means for guiding one of said punches against said tube to strike a glancing blow thereon whereby a hole is cut in said tube, and means for guiding the other of said punches into said hole and completely through said tube at the point of cutting, thereby cutting the tube into two pieces.

9. In an apparatus for cutting tubing, separable jaws for supporting a tube exteriorly around a periphery at the point of cutting the tube, said jaws forming a surface when in closed position, said surface intersecting the tube at the point of cutting, a cutter moving upon said surface and traversing a segment of the cross section of the tube at the point of cutting, thereby cutting a hole in the tube, a second cutter moving upon said surface substantially at right angles to the direction of motion of said first mentioned cutter, and entering the hole cut by said first mentioned cutter and traversing the entirety of said cross section, thereby severing said tube.

10. A device for cutting a tube, comprising separable jaws for holding a tube to be cut at the point of cutting, a groove in said jaws, a cutter operating in said groove, and along a secant line across the section of the tube to be cut at the point of cutting and across a segment of said section, and a cutting edge on an end of said cutter, means for forcing said cutting edge along said secant line, a second groove in said jaws, a second cutter operating in said second groove in a direction substantially at right angles to said first cutter, a cutting edge on an end of said second mentioned cutter, said second mentioned cutter having a substantially constant thickness and a width which decreases toward said end, cutting edges along the sides of said cutter, and means for forcing said first mentioned cutter along said first mentioned groove and through the tube to be cut, whereby an arcuate hole is formed therein, and means for withdrawing the said first mentioned cutter, and means for moving said second mentioned cutter into the hole formed by said first mentioned cutter, and completely through said tube, thereby severing the same.

11. A tube cutting mechanism comprising two sets of separable jaws, surfaces on said jaws conforming to the shape of a tube to be cut for grasping a tube on both sides of the point of cutting, means for opening and closing said jaws, two cutters mounted to move to and from the tube at angles to each other, and means for reciprocating said cutters alternately whereby one cutter makes its cutting stroke in advance of the other cutter.

12. A tube cutting mechanism comprising two sets of separable jaws, surfaces on said jaws conforming to the shape of a tube to be cut for grasping a tube around its periphery at two places, one on each side of the point of cutting, a cutter operating between said two sets of jaws, means for forcing said cutter through the side of the tube and through the opposite side thereof, at an angle sufficiently acute so that the hole of entry and the hole of exit of said cutter are connected, a punch wider than the diameter of the tube, and means for withdrawing said cutter and means for forcing said punch into the hole produced by said cutter, and forcing said punch completely through the tube, thereby severing the same.

13. A tube cutting mechanism comprising separable jaws having surfaces conforming to the shape of a tube to be cut, means for closing said jaws around the tube to be cut, and tightly holding the same, a cutter exterior to said tube and adjacent said jaws, means for forcing said cutter against and through said tube whereby a slot is cut in said tube, a second cutter, and means for forcing said second cutter into said slot and against the interior of said tube adjacent the line of contact of said jaws with said tube and exerting a shearing stress on said tube along said line, thereby severing said tube.

14. A tube cutting mechanism comprising a set of dies for holding a tube to be cut, each of said dies having one plane surface, a groove in each of said dies traversing said plane surface and conforming to the shape of the tube to be cut, means for slidably supporting one of said dies, means for sliding said die away from the other of said dies thereby enlarging the opening between said dies formed by said grooves, means for closing said dies upon a tube to be cut at the point of cutting, and two punches operating at angles to each other, means for guiding one of said punches against said tube to strike a glancing blow thereon whereby a hole is cut in said tube, and means for guiding the other of said punches into said hole and completely through said tube, thereby cutting the tube into two pieces.

FRED GRIEDER.